United States Patent [19]

Westbeck

[11] 3,801,743

[45] Apr. 2, 1974

[54] DEVICE FOR AUTOMATICALLY ESTABLISHING CONNECTIONS FROM A SENDING STATION OVER A TELECOMMUNICATIONS NETWORK

[75] Inventor: Gunnar Westbeck, Solna, Sweden

[73] Assignee: Aktiebolaget Gylling & Co., Bromma, Sweden

[22] Filed: June 20, 1972

[21] Appl. No.: 264,610

[52] U.S. Cl. .................................. 179/5 R, 179/2 A

[51] Int. Cl. .......................................... H04m 11/04

[58] Field of Search ............. 179/2 A, 2 R, 5 R, 5 P

[56] References Cited

UNITED STATES PATENTS

| | | | |
|---|---|---|---|
| 3,588,362 | 6/1971 | Kass | 179/5 R |
| 3,702,902 | 11/1972 | Willis | 179/5 R |

*Primary Examiner*—Ralph D. Blakeslee

*Attorney, Agent, or Firm*—Strauch, Nolan, Neale, Nies and Kurz

[57] ABSTRACT

A device for automatically establishing connections from a sending station to receiving stations over a telecommunications network having automatic exchanges and for transmitting signals to a receiving station over a connection thus established. Particularly, a device of this kind connects to a public telephone network having automatic switching stations, the device being connected to an ordinary subscriber's line which connects the sending station with an automatic switching station.

6 Claims, 6 Drawing Figures

DEVICE FOR AUTOMATICALLY ESTABLISHING CONNECTIONS FROM A SENDING STATION OVER A TELECOMMUNICATIONS NETWORK

Signalling devices of this kind can be used for many different purposes. Thus, they may be used in buildings for automatic alarm signalling in the case of fire, burglary, flood and other abnormal occurrences such as interruptions and faults in the operation of machinery such as heating systems, refrigerating systems, elevators etc. They can also be employed in industrial plants, power stations, pumping systems and other systems for the continuous supervision of the operation of the system and transmitting alarm signals in the case of faults and even for the transmission of data, e.g., measuring results.

The signalling device has connected thereto one or more sensing or detecting means which are actuated in response to occurrences or conditions on which information is to be sent to a receiving station. Such sensing means are e.g., thermostats, pressure indicators, level indicators, photocells, relays, counters, means for detecting gas or radioactive radiation and measuring and indicating devices of many other types.

When such a sensing means is actuated the signalling device is put into operation, connects itself to the telephone line and transmits a code signal corresponding to the number of the receiving station. If the receiving station is not connected to the same exchange as the sending station, it is then necessary in some telephone systems to dial first a particular area number and then the subscriber's number. Under the control of the transmitted number signals the sending station is connected over one or more exchanges to the desired receiving station. Then the sending station transmits automatically information signals over the established connection, and these information signals are received at the receiving station by staff or means for automatically recording the information signals. The receiving station is preferably provided with means for transmitting automatically a return signal to the sending station when the information signals have been received, and the sending station comprises means responsive to these return signals to stop the signalling and to disconnect the sending station from the telephone line.

Thus, the signalling device should be able to transmit switching signals for establishing the desired connection as well as information signals. In most telephone systems the switching signals consist of series of break pulses, each such series representing a digit of the called number. The information signals may be of any kind, but preferably they consist of code signals formed by an audiofrequency modulated by pulses of the same kind as those used for the switching signals. Hereby the means for producing the information signals can for the most part be designed in the same manner as the means for producing the switching signals.

Signalling systems of this kind are previously known and have been described e.g., in U.S. Pat. No. 3 128 350 (corresponding to Swedish Pat. No. 196 765), U.S. Pat. No. 3 283 572 (corresponding to Swedish Pat. No. 212 256, British Pat. No. 919 909 and German Pat. No. 1 170 475) and U.S. Pat. No. 3 492 650 (corresponding to Swedish Pat. No. 314 012 and German published application 1 269 646).

It is a common characteristic of these known systems that the pulse series forming the switching signals and the information signals are produced by means of motor driven switches which are connected in series with a voltage source in a circuit which is alternately interrupted and closed when the switch is operating, thereby producing pulses in the circuit. Such a switch may comprise a rotating contact arm coacting with fixed contact segments or a rotating disc provided with suitably arranged contact segments and contacts coacting with these contact segments.

It is also previously known to provide systems of this kind with a code selecting unit which permits the optional setting of the identifying code (number) of the desired receiving station and the setting of a desired code signal to be transmitted to the receiving station. In the system described in said U.S. Pat. No. 3 492 650 this code selecting unit consists of a first and a second set of conductors with connecting means for connecting any one of the conductors of the first set to any one of the conductors of the second set, each conductor of the first set being connected to a separate contact in a first switch having a rotating contact arm, and each conductor of the second set being connected to a separate contact in a second switch having a rotating contact arm which rotates at a lower rate than the contact arm of the first switch, so that the first mentioned contact arm glides over all the contacts of the first switch while the contact arm of the second switch glides over a single contact of the second switch. Thus, during each revolution the first switch produces a pulse series, and the second switch performs a time distribution of these pulse series. The number of pulses in each pulse series is determined by the position of said connecting means in combination with a rectifier device.

These known systems suffer from certain drawbacks which are primarily due to the fact that the signal transmission is effected by means of motor driven switches. When the system is started in response to the actuation of a sensing means, it will always perform a complete operating cycle before it is restored to the initial position even if the desired connection cannot be established e.g., because of blocking in the automatic telephone exchange, busy line to the receiving station or for other reasons. This results in the outgoing line from the sending station and also certain components of the automatic telephone exchange being kept busy unnecessarily. Also the rotating switches require great precision in the manufacture, and the contacts are subjected to wear and dirt which may jeopardize their function. Furthermore, the use of motor driven switches makes it more difficult to make the system meet the various requirements imposed on such systems by telephone administrations of different countries.

It is an object of the invention to provide a system of this kind which does not suffer from the drawbacks mentioned above and does not require any movable parts apart from a few relay contacts and which in the case of an unsuccessful attempt to establish a connection is restored to the initial position without unnecessary time delay. It is also an object of the invention to provide a system which can be adapted to different needs and requirements by simple means and by the use of a few standardized units.

Thus, the invention relates to a device for automatically establishing connections from a sending station over a telecommunications network having automatic switching centers and transmitting signals to a receiving station over the established connection, said device comprising means for connecting thereto sensing means to be operated in response to occurrences, on which information is to be sent to a receiving station, connecting means for automatically connecting the device to a transmission channel leading to a switching center in the automatic telecommunications network, a pulse generator, a code setting unit for optional setting of an identifying code of a desired receiving station and setting of a desired code signal to be transmitted to the receiving station, said code setting unit comprising a first set of conductors and a second set of conductors and connecting means for connecting any one of the conductors of the first set of conductors to any one of the conductors of the second set of conductors and means for applying a potential to the conductors of one set of conductors, said first set of conductors comprising several groups of conductors, said groups being allotted to different functions such as the transmission of area numbers, the transmission of subscribers numbers and the transmission of information signals. According to the invention the device comprises a first counter, control means for connecting said groups of conductors of said first set of conductors in turn to said first counter so that output terminals of said first counter are connected to separate ones of the conductors of the connected group and said first counter, when being stepped forwards, in turn marks the conductors of this group, a second counter having its output terminals connected to separate ones of the conductors of said second set of conductors, said second counter being stepped forwards in response to pulses from said pulse generator, so that the conductors of the second set of conductors are in turn marked by the second counter, a pulse transmission device which is connectable to said transmission channel and controlled by said first and second counters, so that for each conductor marked by said first counter in the first set of conductors a pulse train is transmitted, the number of pulses in each pulse train being determined by the interconnection between the marked conductor of the first set of conductors and the conductors of the second set of conductors, a first zero setting device for setting said second counter to zero after each completed pulse train, a stepping device for stepping said first counter after each completed pulse train so that the next conductor in the same group of conductors of the first set of conductors is marked, a second zero setting device for setting said first counter to zero after it has marked a predetermined number of conductors of the connected group, and said control means being operative after the first counter has marked the conductors of a group to connect the next group of conductors to the first counter.

Thus, for the setting of the identifying code of the desired receiving station and the setting of the desired code signal the invention employs a code selecting unit of known kind including a first and a second set of conductors and connecting means for connecting any one of the conductors of the first set to any one of the conductors of the second set. The code selecting unit may be combined with rectifiers in the manner disclosed in the said U.S. Pat. No. 3,492,650, but this is not necessary and many modified embodiments of this code selecting unit can be employed in the device according to the invention. The connecting means for connecting a conductor of the first set with a conductor of the second set can be remote controlled.

According to the invention the device preferably includes a signal receiver which is automatically connectable to said transmission channel for receiving signals received over this channel and for producing control signals in response to such incoming signals. These control signals are applied to the said control means to cause it to start the transmission of signals. The said incoming signals may be e.g., the dialling tone which is transmitted in some telephone systems from the switching center to indicate that the switching center is prepared to receive switching signals, a second dialling tone which is transmitted from the switching center after the reception of an area number to indicate that dialling of the subscriber's number can start, and a receipt signal from the receiving station to indicate that it is prepared to receive messages. If one or more of these signals fail to arrive, the said control means restores the device to the initial position and starts a new switching cycle.

If a first attempt to establish a connection is unsuccessful the device automatically starts further operating cycles until the desired connection is established and the information signals have been transmitted. However, most telephone administrations prescribe that the number of attempts to establish a connection be limited and therefore the device may be provided with a stop counter which counts the number of such attempts and prevents further attempts when this number has reached a predetermined value.

Other features of the invention will appear from the following description with reference to the accompanying drawings.

Figure 1:
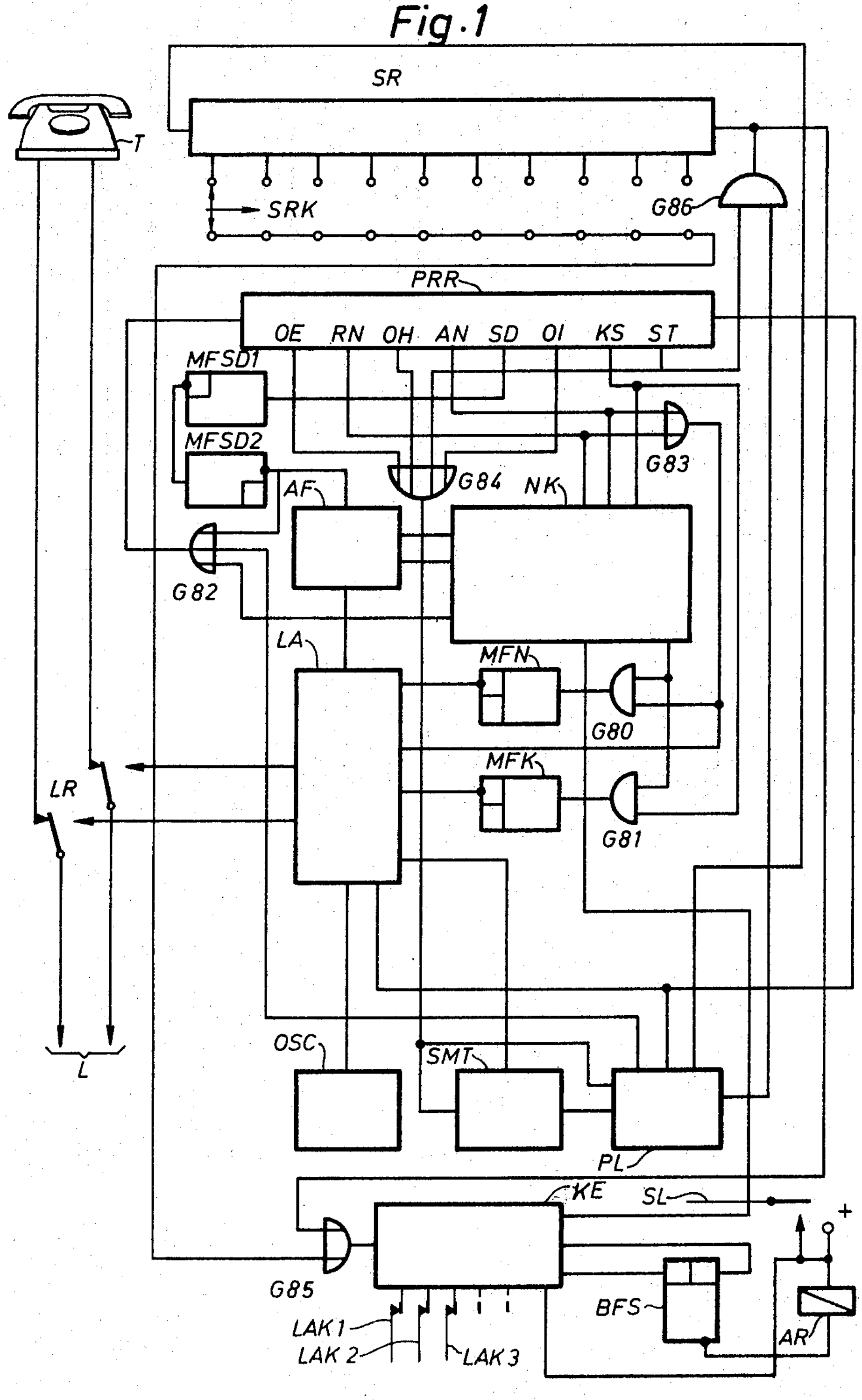
FIG. 1 shows a block diagram of a signalling device in accordance with this invention intended to be connected to a public telephone network.

In FIG. 1 L designates an outgoing line to an automatic telephone central office or exchange. When the automatic signalling device is in rest condition line L is connected to an ordinary subscriber's apparatus T over relay contacts LR. When the signalling device is put into operation line L is connected over contacts LR to the line connecting unit LA. In addition to the line connecting unit LA the device comprises the following main parts: Dialling and code transmitting unit NK, a multivibrator AF, an oscillator OSC, a signal receiver SMT, a program logic unit PL, a program counter PRR, a stop counter SR and a code unit KE.

To the code unit KE are connected one or more sensing means which are symbolized in FIG. 1 by contacts LAK1, LAK2, LAK3 . . . . In the shown embodiment the sensing means are normally conductive and when actuated they interrupt a circuit in which current normally flows. Therefor, the said contacts have been shown as break contacts, and the code unit KE is designed to respond when one of these contacts are broken. This is however not essential to the invention, and the sensing means and the code unit can be designed in other ways.

The mode of operation of the device will now be broadly described with reference to FIG. 1.

When one of the sensing means is actuated the code unit KE responds and transmits over one of its outputs a start signal to a flip-flop BFS, thereby causing this flip-flop to close an energizing circuit of a relay AR. Operating voltage is now supplied to the different parts of the device over a make contact on this relay and a line SL. The code unit KE also delivers over another output a signal to the unit NK for setting a certain code according to which of the contacts LAK1, LAK2, LAK3 . . . was actuated.

When operating voltage is supplied to the device a relay in the line connecting unit LA is energized under the control of the program logic PL, and this relay changes the contacts LR so that line L is now connected to the line connecting unit LA. The program counter PRR is stepped to a first position OE and actuates over the OR-gate G84 the signal receiver SMT to make it ready to receive dialling tone which arrives over line L and the line connecting unit LA. If dialling tone is received within a predetermined time, an output signal is delivered by signal receiver SMT to the program logic PL which is thereby caused to actuate the program counter PRR over an OR-gate G82 so that the program counter is stepped to position RN. If dialling tone is not received within the predetermined time, the program logic PL delivers a signal which is applied to the program counter PRR to restore the counter to zero and also applied to the line connecting unit LA causing the line relay LR to be deenergized. After a further time which is determined by means of the program logic PL, another attempt to establish a connection is made, i.e., line L is again connected to the line connecting unit LA and the described operations are repeated.

If dialling tone has been received so that the program counter PRR has been stepped to position RN, the dialling and code transmitting unit NK is started and transmits pulse trains representing the digits of an area number. These pulses are produced by the multivibrator AF, but the number of pulses in each pulse train is determined by the setting means in the unit NK. The pulses delivered from unit NK are applied over the AND-gate G80 to a monostable multivibrator MFN. At the same time the second input of the AND-gate G80 is activated by a signal supplied from output RN of the program counter PRR over the OR-gate G83. The multivibrator MFN actuates a pulse relay in the line connecting unit LA.

When the transmission of the pulse trains representing the area number is completed, a signal is delivered from unit NK over the OR-gate G82 to the program counter PRR whereby this is stepped to position OH. From position OH the signal receiver SMT is again activated so that it is ready to receive from line L a second dialling tone indicating that transmission of the subscriber's number can be started. If this dialling tone does not arrive within a predetermined time the program counter PRR is again set to zero and line L is disconnected in the manner described above, whereupon after a further predetermined time a new attempt to establish the connection is made. If however the last mentioned dialling tone arrives within the prescribed time, a signal is delivered from the program logic PL over the OR-gate G82 to the program counter PRR and steps this to position AN.

Now a signal is delivered from output AN of the program counter PRR to the unit NK whereby this is caused to transmit pulse trains representing the set subscriber's number. These pulse trains are applied in the same way as the pulse trains representing the area number over the OR-gate G80 to the multivibrator MFN which controls the pulse relay in the line connecting unit LA.

When the transmission of the subscriber's number is completed, the unit NK again delivers a stepping signal over the OR-gate G82 to the program counter PRR so that the program counter is stepped to position SD. In this position the program counter triggers a monostable multivibrator MFSD1 so that this is changed over from its stable to its unstable state. The multivibrator MFSD1 is so designed that it remains in its unstable state during a sufficiently long time to permit a certain number, e.g., three or four, ringing signals to be sent to the receiving station. When after this time multivibrator MFSD1 is restored to its stable state it delivers an output pulse which triggers a second monostable multivibrator MFSD2 so that this is changed over from its stable to its unstable state. In its unstable state multivibrator MFSD2 actuates the multivibrator AF which is thereby caused to produce pulses of a frequency of e.g., 20 Hz. These pulses are passed to the line connecting unit LA, and in this unit the pulses are caused to modulate an audiofrequency signal with a frequency of e.g., 1,700 Hz which is generated by the oscillator OSC. The signal thus modulated (keyed) is transmitted over the established connection to the receiving station and serves as a start signal for the receiving equipment at the receiving station. The duration of this signal is determined by the restoring time of the monostable multivibrator MFSD2 and is e.g., one second. When multivibrator MFSD2 is restored to its stable state, a pulse is delivered from its output and passed over the OR-gate G82 to the program counter PRR which is thereby stepped to position OI. In this position the program counter again activates the signal receiver SMT.

It is assumed that the receiving station after the reception of said start signal will send a receipt signal or clear tone to the sending station to indicate that the receiving station is ready to receive message signals. If this receipt signal does not arrive at the sending station within a predetermined time, the program counter PRR is again set to zero and line L is disconnected under the control of the program logic PL, whereupon after a certain further time another attempt to establish the connection is made. If the receipt signal arrives at the signal receiver SMT within the said predetermined time, the program logic PL is actuated and transmits a stepping signal over the OR-gate G82 to the program counter PRR whereby this is stepped to position KS.

In position KS the program counter again actuates the unit NK so that this now transmits the set code signals. These code signals consist of an audiofrequency signal having e.g., the frequency 1,700 Hz which is modulated with pulses of the same kind as those used for the switching signals. The audiofrequency signal is generated by the oscillator OSC and is applied to the line connecting unit LA in which it is modulated with the pulses supplied from unit NK over the AND-gate G81 and the monostable multivibrator MFK. The second input of the AND-gate G81 receives an activating signal from the output KS in the program counter PRR.

When the code signalling has been completed, unit NK again delivers a stepping pulse over the gate G82 to the program counter PRR which is thereby stepped to position ST. In this position the program counter again activates the signal receiver SMT whereby this is prepared to receive a stop signal from the receiving station. If such stop signal does not arrive within a predetermined time the program counter PRR is again set to zero and line L is disconnected under the control of the program logic PL, whereupon after a certain further time a new attempt of establishing the connection is made. If however the stop signal arrives within the predetermined time it is detected by the signal receiver SMT and caused to actuate the program logic to send a stop signal to the code unit KE. This stop signal passes over the AND-gate G86, the second input of which is activated from the output ST of the program counter PRR, and an OR-gate G85. Hereby the code unit KE is caused to transmit a signal which is applied to the second input of the flip-flop BFS whereby the flip-flop BFS interrupts the energizing circuit of relay AR so that the operating voltage is disconnected from the whole device.

If a started switching operation or signal transmission cannot be completed, e.g., because some of the said tone signals from the exchange or the receiving station fails to arrive, the device is restored in the manner described to the initial position, and another attempt to establish the connection is made after a certain time. For each such unsuccessful attempt the stop counter SR is stepped forwards one step under the control of the program logic PL. If the connection and the signal transmission is completed the stop counter SR is set to zero by the stop signal from the program logic PL. If however no attempt to establish the connection is successful, the stop counter SR when stepped forwards a predetermined number of steps will deliver a stop signal over the OR-gate G85 to the code unit, whereby the whole device is released and new attempts of establishing connections are prevented. This predetermined number of counting steps of the stop counter SR can be manually set by means of a contact device SRK.

The device will now be described more in detail with reference to FIGS. 2 – 6.

Figure 2:
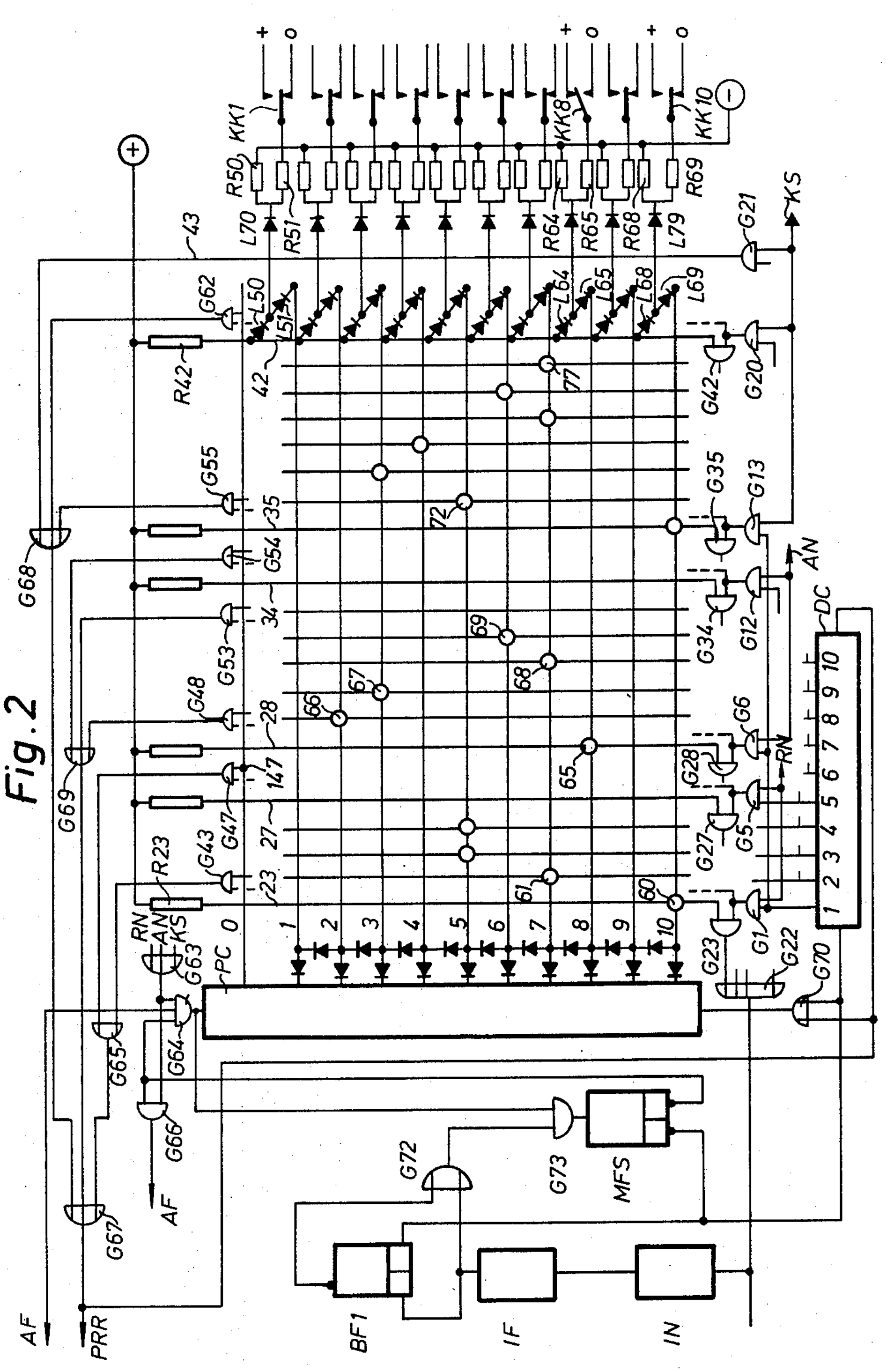
FIG. 2 shows a circuit diagram of the dialling and code transmitting unit of the device.
Figure 3:
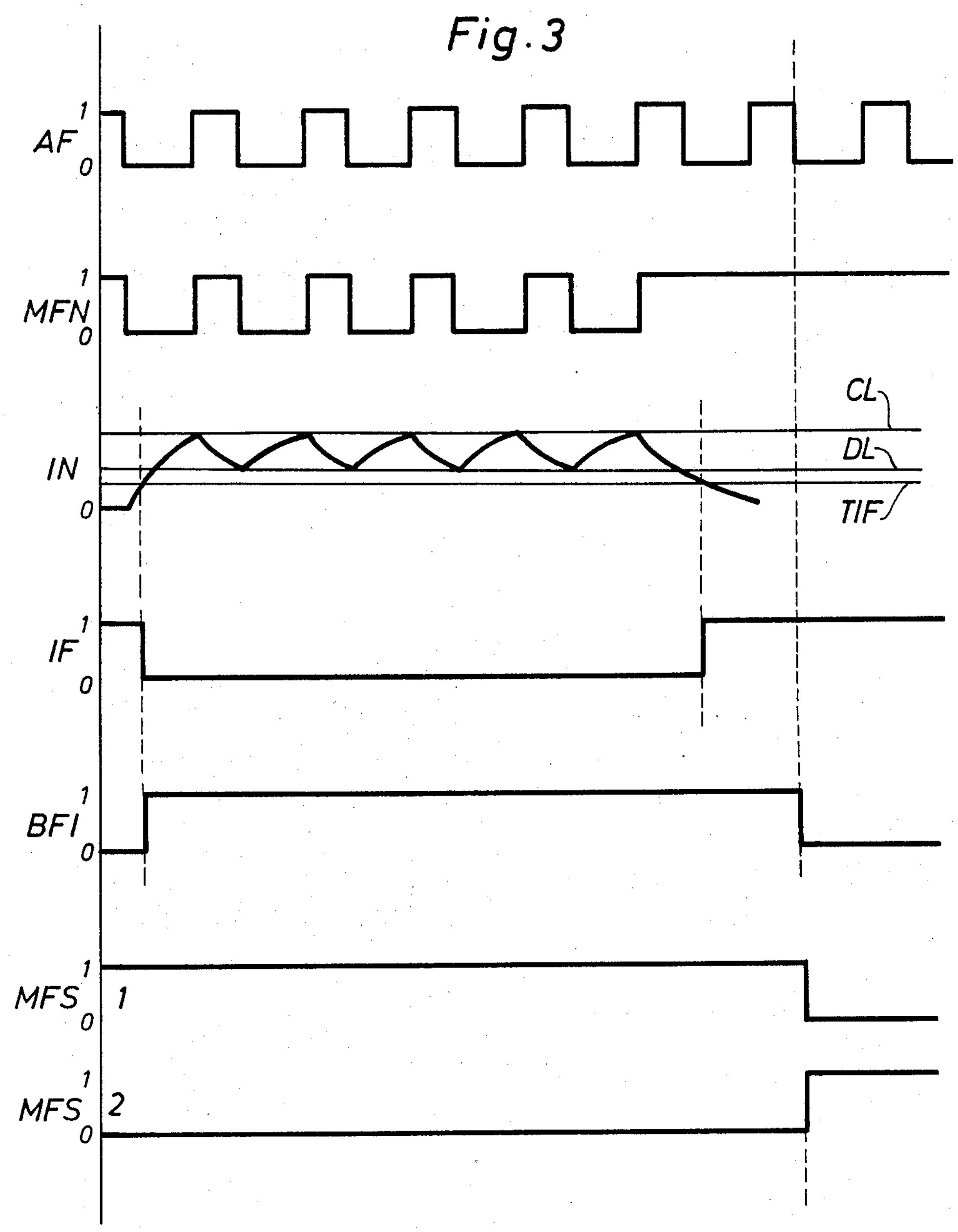
FIG. 3 shows graphs illustrating the function of certain parts of the unit shown in FIG. 2.

FIG. 2 shows an embodiment of the dialling and code transmitting unit NK (FIG. 1). This comprises a setting unit for the optional setting of identifying code of the desired receiving station and the setting of the desired code signal to be transmitted to the receiving station. This setting unit is designed in a manner known in the art and comprises a first set of conductors 23 – 42 and a second set of conductors 1 – 10. Each conductor of the first set can be connected to any one of the conductors of the second set by means of a connecting member. In FIG. 2 some of these connecting members are schematically indicated by circles (e.g., 60, 65, 72) at some of the crossing points between conductors of the two sets of conductors. The connecting members can be of any known type, e.g., plugs which can be inserted in the crossing points between the conductors of the two sets of conductors so that the plug produces a conductive connection between the two conductors crossing each other at the crossing point. It is also possible to make the contact members in the form of glide contacts which are displaceable along separate ones of the conductors 23 – 42 and provided with contact surfaces which can be caused to make contact with any one of the conductors 1 – 10 of the second set of conductors. However, the connecting members may also be of an electronic type and adapted to be remotely controlled. In FIG. 2 it is shown how the conductor 42 of one set of conductors can be connected to any one of the conductors in the other set of conductors over electronic connecting members each consisting of a couple of diodes. The mode of operation of these connecting members will be described more in detail below.

Each of the conductors 23 – 42 of the first set of conductors is connected to a positive potential over a resistor R23 . . . R42. The conductors 23 - 42 of the first set of conductors are also connected to one input of each one AND-gate G23 . . . G42. For the sake of clarity all these gates are not shown in FIG. 2. Each of the AND-gates G23 – G42 has two inputs, and the second inputs of these gates are connected to the outputs from each one of the AND-gates G1 – G21.

The conductors 23 – 42 of the first set of conductors are divided into three groups which are allotted to different functions. Conductors 23 – 27 form a first group alotted to the transmission of area numbers, conductors 28 – 34 form a second group allotted to the transmission of subscribers numbers, while conductors 35 – 42 form a third group allotted to the transmission of coded message signals. The belonging to a certain group is determined by the fact that one input of all the AND-gates G1 – G5 which are allotted to conductors 23 – 27, is connected to the output RN of the program counter PRR (FIG. 1), one input of all the AND-gates G6 – G12 which are allotted to conductors 28 – 34 is connected to the output AN of the program counter PRR, while one input of all the gates G13 – G21 which are allotted to conductors 35 – 43 is connected to the output KS of the program counter PRR. The second inputs of gates G1 – G5, G6 – G12 and G13 – G21 are connected to different outputs of a counter DC which will be referred to as the digit counter in the following. Thus the gates G1, G6 and G13, that is, the first gate of each group, are connected by its second input to the output 1 of the digit counter DC, while the second gate G12, G7 and G14 (not shown in FIG. 2) has its second input connected to the output 2 of the digit counter DC etc.

The conductors 1 – 10 of the second set of conductors in the setting unit are connected to separate outputs of a second counter PC which will be referred to in the following as the pulse counter. Conductors 1 – 10 are also connected to separate taps on a rectifier chain GK which consists of a plurality of rectifiers connected in series and poled in the same direction. This arrangement is previously known in the art, e.g., by the said U.S. Pat. No. 3 492 650. When the pulse counter PC is stepped forwards (in a manner to be described later) it connects in turn the conductors 1 – 10 to ground or to the negative pole of the voltage source applying a positive potential to conductors 23 – 42 of the first set of conductors. When a conductor (e.g., 24) of the first set of conductors is connected by one of said connecting members (e.g., 61) with one (e.g., 7) of the conductors of the second set of conductors, and the pulse counter PC is stepped forwards, current paths will be formed from positive potential over the said conductor (24) of the first set of conductors, said connecting member (61) to the said conductor (7) of the second set of conductors and those other conductors (1–6) of the second set which are so positioned in relation to the connecting point (61) that the applied potential acts in the forward direction of those rectifiers of the rectifier chain GK which connect the last mentioned conductors (1–6) with the conductor (7) which is directly connected over the connecting member (61) to the said conductor (24) of the first set of conductors. When the pulse counter PC has been stepped past the last mentioned conductor (7) and connects the other conductors (8–10) of the second set of conductors, no such current paths are established, since those rectifiers of the rectifier chain GK which connect said other conductors (8–10) with the conductor (7) which is directly connected over the connecting member (61) with a conductor (24) of the first set of conductors, offers its back resistance to the applied potential. Thus, during an operating cycle of the pulse counter PC a certain number of pulses depending on the position of said connecting member (e.g., 61) will be produced in that conductor (24) of the first set which is connected by means of the connecting member (61), and each such pulse will cause a momentary decrease of the potential on the last mentioned conductor (24), and this potential decrease will appear at one input of that gate of the gates G23 – G42 which is connected to the conductor. If the second input of this AND-gate has at the same time a suitable potential, a pulse will be delivered from the output of the AND-gate, and this pulse is utilized to produce a corresponding pulse in the line L (FIG. 1) as will be described in the following.

In addition to the conductors 1 – 10 the second set of conductors comprises a further conductor which is connected to the output 0 of the pulse counter PC. This conductor can be connected by means of connecting members of the same kind as the aforementioned connecting members to one input of one or more of a number of AND-gates G43 – G62. There is provided one such AND-gate for each conductor of the first set of conductors, and its second input is connected to the output of a corresponding one of the AND-gates G1 – G21. The purpose of the AND-gates G43 – G62 will appear from the following description.

The mode of operation in dialling and code transmission is as follows.

When the program counter PRR (FIG. 1) has been stepped to position RN in the manner described above, an activating signal is delivered from output RN to one input of all AND-gates G1 – G5 and to one input of an OR-gate G63. The digit counter DC initially is in position 1, and the AND-gate G1 now receives activating signals at both inputs and delivers an output signal to one input of the AND-gate G23. The OR-gate G63 delivers an output signal to one input of an AND-gate G66, the second input of which is connected to the output of a monostable multivibrator MFS. It is assumed that in the shown embodiments flip-flops and gates are changed from one condition to the other when an input signal goes from "1" to "0", that is from positive potential to zero potential. This means that negative-going pulse edges are employed for the change. When the OR-gate G63 receives a control signal from output RN of the program counter PRR, the output of this gate goes from "1" to "0". In its initial condition the monostable multivibrator MFS applies the signal "0" to the gates G64 and G66. The AND-gate G66 which is of the inverting type, now delivers a positive potential at its output, and this potential is applied to the multivibrator AF (FIG. 1) which is thereby started and generates pulses with a repetition frequency of 10 Hz. These pulses are passed over the AND-gate G64 to the pulse counter PC so that the pulse counter is stepped forwards. The AND-gate G64 is changed from "1" to "0" each time as the signal from the multivibrator AF is similarly changed. The pulse counter PC which has conductor 0 connected thereto in its initial position, is now stepped and connects in turn the conductors 1 – 10 to ground. It is now assumed that the first digit to be sent is 0 and that this digit is represented by ten pulses. The connecting member 60 the position of which determines the first digit, is therefore set to connect the conductor 23 of the first set of conductors to conductor 10 of the second set of conductors. The gate G23 receives the signal "0" at its second input from the output of gate G1, and for each step performed by the pulse counter PC the gate G23 will therefore deliver an output signal which is passed over the OR-gate G22 to one input of the AND-gate G80 (FIG. 1) the second input of which at the same time receives an activating signal over the OR-gate G83 from output RN of the program counter PRR. The AND-gate G80 will thus deliver output signals in time with the pulses applied to the monostable multivibrator MFN. The monostable multivibrator MFN is triggered by the negative-going edge of each incoming pulse. As stated above the pulse repetition frequency is 10 Hz which corresponds to a period of 100 ms. The output signal from the monostable multivibrator MFN operates the pulse relay IR (FIG. 5) in the line connecting unit LA. The monostable multivibrator MFN is so designed that it is restored to its initial state after 60 ms, and since the time interval between two triggerings of the multivibrator MFN is 100 ms, a make-to-break ratio of 40:60 for the pulse current in line L is obtained which is a usual standard value in most telephone systems.

The pulse counter PC is so designed that upon shifting from one output to the next one the first mentioned output is reset to "1" before the next output is set to "0". This is necessary in order that a negative-going pulse edge for triggering the monostable multivibrator MFN shall be obtained each time as the pulse counter is stepped.

When the pulse train representing the first digit of the area number has been transmitted, the pulse counter PC should be reset and the digit counter DC shifted to the next output. In the embodiment shown in FIG. 2 this is accomplished by means of an integrator IN, a pulse forming circuit IF, the bistable flip-flop BF1 and the monostable multivibrator MFS. The operation of these parts will be described with reference to FIG. 3. In this Figure the top graph which is designated AF represents the pulses from the multivibrator AF. The graph MFN represents the pulses applied to the monostable multivibrator MFN. As will be seen from FIG. 2 these pulses are also passed to the integrator IN. In this the pulse signal to MFN is integrated in the manner illustrated by graph IN in FIG. 3 which shows the output voltage of the integrator as a function of time. As shown by this graph the output rises when the input voltage goes down to zero for triggering MFN. This means that the integrator IN inverts the signal. The output signal from the integrator IN first rises along an exponential curve during the time when signal "0" appears at the input. After the input signal has returned to "1" the output voltage from the integrator IN drops to a value determined by the time constant of the integrator. The output signal of the integrator IN is passed to the pulse forming circuit IF, and when the output voltage from the integrator has reached a first threshold value TIF the pulse forming circuit IF is actuated so that its output signal goes from "1" to "0" as shown by graph IF in FIG. 3. The output signal from IF actuates the bistable flip-flop BFI so that its output is changed from "0" to "1" and thus delivers the signal "1" to a gate G72. The gate G72 which has a second input directly connected to the output of the pulse forming circuit IF, is so designed that it delivers the output signal "1" when it receives the input signal "0" at one input and the signal "1" at its other input but delivers the output signal "0" if the signal "1" is applied to both inputs. The output of gate G72 is connected to one input of an AND-gate G74 the second input of which receives (over gate G64) the pulses from the multivibrator AF. The pulse forming circuit IF which preferably consists of a Schmitt-trigger, continues to deliver the output signal "0" as long as the pulse generation is going on, since the output of the integrator IN does not drop below a certain level DL which lies above the threshold value TF. When the pulse generation ceases, however, the output voltage of the integrator IN drops with a certain time delay below the level TIF, whereby the pulse forming circuit IF is caused to deliver the output signal "1". Thus, gate G72 now receives signal "1" at both inputs and consequently delivers an output signal "0" to the gate G74. When the next pulse from the multivibrator AF goes from "1" to "0" the gate G74 delivers an output signal to the monostable multivibrator MFS. As stated above one output of this multivibrator is connected to one input of the AND-gate G66, and the signal from this one output now goes from "0" to "1" (graph MFS2 in FIG. 3), whereby the output signal from gate G66 goes from "1" to "0" thereby stopping the multivibrator AF. The second output of multivibrator MFS which normally delivers the signal "1" (graph MFS1 in FIG. 3), now delivers the output signal "0". This output signal resets (over gate G70) the pulse counter to zero and shifts the digit counter DC one step (from output 1 to output 2). This signal also restores the bistable flip-flop BF1. The monostable multivibrator MFS is restored to its stable state after a time chosen under consideration of the stipulated time interval between the last pulse of a digit and the first pulse of the next digit. This time interval is for instance 600 – 800 ms.

When the monostable multivibrator MFS has been restored to its stable state the gate G66 again receives activating signals at both inputs and the multivibrator AF is started again. The digit counter DC now delivers an output signal at the output 2 which is connected to the second gate (not shown) of the group of gates G1 – G5. When the pulse counter PC is now again stepped, an outgoing pulse train is produced corresponding to the second digit of the area number. This digit is set by means of connecting member 61 and as shown in FIG. 2 this digit is 7 in the chosen example. The following digits of the area number are now dialled in the same manner as described above. In the chosen example this area number is assumed to be the four digit number 0755. After the transmission of the pulse train representing the last digit of the number the digit counter is stepped to output 5 which is connected to one input of gate G5. The associated conductor 27 of the first set of conductors is however not connected to any of conductors 1 – 10 of the second set of conductors. Instead one input of the AND-gate G47 is connected by a connecting member 147 to the conductor 0, and since the other input of this gate G47 is connected to the output from gate G5 which is now activated by the digit counter DC, the gate G47 will deliver an output signal which is passed over the OR-gates G65 and G67 to the program counter PRR (FIG. 1) and steps this counter to position OH. Then the OR-gate G63 does not receive any signal from the output RN of the program counter PRR, and thereby the multivibrator AF is stopped over gate G66. The output signal from gate G67 is also applied to the digit counter DC and over gate G70 to the pulse counter PC and sets both counters to zero.

As mentioned above the telephone system is assumed to be such that when an area number has been transmitted to the exchange, a dialling tone must be received from the exchange before the transmission of the subscriber's number can take place. The position OH of the program counter PRR is a waiting position for such dialling tone, and if this arrives within a predetermined time the program counter is stepped to position AN. Hereby the dialling of the subscriber's number is started. From output AN of the program counter PRR an activating signal is sent to one input of all AND-gates in the group G6 – G12 and to the OR-gate G63. Hereby the transmission of the subscriber's number is initiated. The pulse transmission and the resetting of the pulse counter PC and the stepping of the digit counter DC after each digit is performed in the same way as in the transmission of the area number. In the example illustrated in FIG. 2 it is assumed that the five digit subscriber's number 82376 is to be dialed. This number is set by the conductors 28 – 32 of the first set of conductors being connected by the connecting members 65 – 69 respectively to the conductors 8, 2, 3, 7 and 6 respectively of the second set of conductors. After the last digit of the subscriber's number has been transmitted the digit counter DC is stepped to position 6 from which the gate G53 receives an activating signal at its one input. The second input of gate G53 is connected by a connecting member to the output 0 of the pulse counter PC, and from the output of gate G53 an output signal is now transmitted over gates G69 and G67 and resets the pulse counter PC and the digit counter DC and steps the program counter PRR to position SD.

Figure 5:
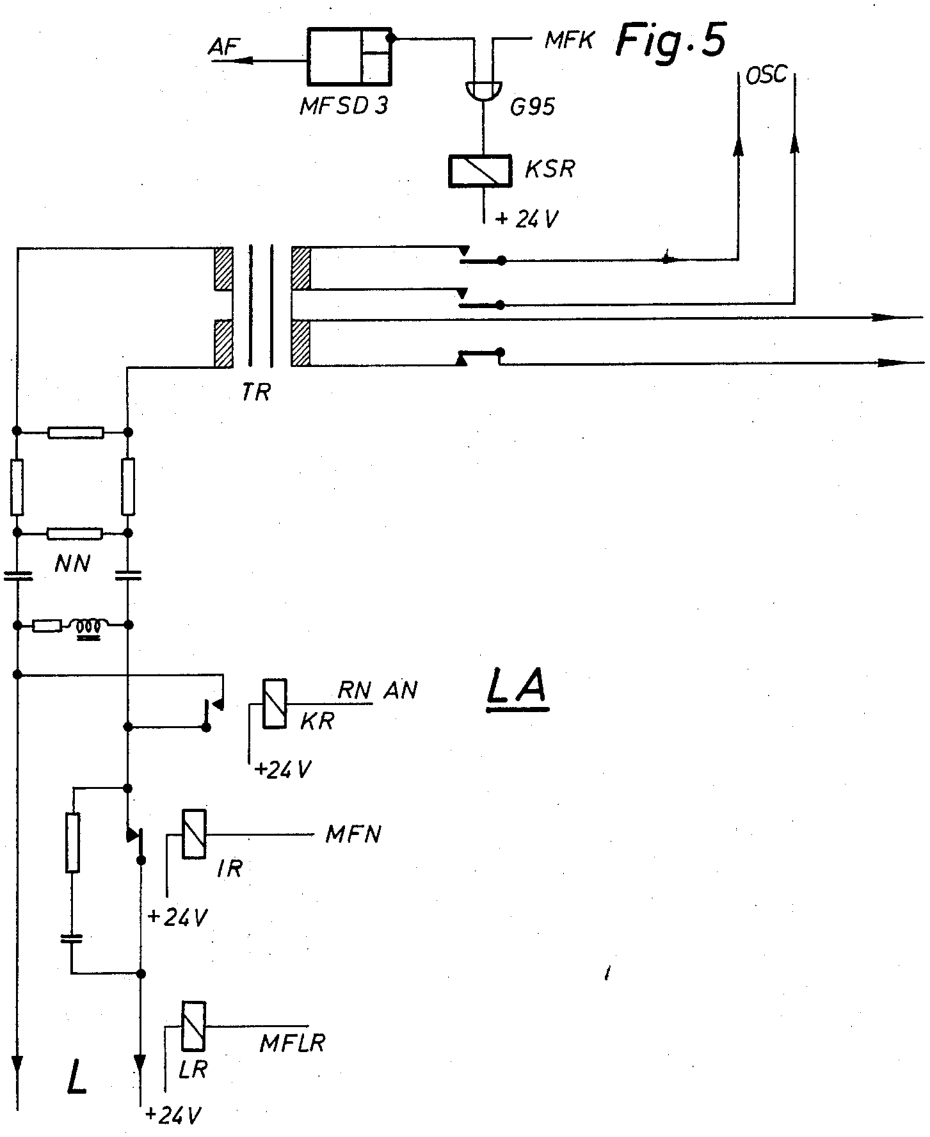
FIG. 5 shows a circuit diagram of a line connecting unit.

When the program counter PRR is in position SD, a start signal is sent over the established connection to the receiving station. In the described example this start signal consists of an audiofrequency signal of the frequency 1,700 Hz which is modulated (keyed) with a frequency of 20 Hz. The 20 Hz modulating signal is derived from the multivibrator AF (FIG. 1). This multivibrator which normally oscillates with a frequency of 10 Hz, is provided with a frequency control circuit actuated by the said output signal from the monostable multivibrator MFSD2, so that the multivibrator AF under the control of this output signal is caused to produce pulses with a repetition frequency of 20 Hz. These pulses are applied to a monostable multivibrator MFSD3 in the line connecting unit LA (FIG. 5), and the output signal from this multivibrator operates a relay KSR over an OR-gate G95. Make contacts of relay KSR are connected in a circuit from the oscillator OSC (FIG. 1) to a winding on a transformer TR (FIG. 5). The oscillator OSC generates the said audiofrequency signal with a frequency of 1,700 Hz. The modulated signal is passed over transformer TR to line L. After the transmission of this start signal, the program counter PRR is stepped in the manner previously described to position OI which is a waiting position for awaiting a receipt signal or clear tone from the receiving station. If this receipt signal arrives within a predetermined time, the program counter PRR is stepped to position KS whereby the transmission of code signals is initiated from the dialling and code transmitting unit NK. This is accomplished by an activating signal from the output KS of the program counter PRR being applied to one input of each of the AND-gates G13 – G21 and the OR-gate G63. Hereby the multivibrator AF is again made operative, and the transmission of pulse trains representing the set code is started. The pulses coming from the gate G22 in the dialling and code transmitting unit NK are passed to the monostable multivibrator MFK over the AND-gate G81 (FIG. 1) the second input of which is now activated from the output KS of the program counter PRR. The output signal from the multivibrator MFK controls the relay KSR in the line connecting unit LA (FIG. 5) over the gate G95, whereby the 1,700 Hz signal from the oscillator OSC is modulated with 10 Hz and transmitted over transformer TR to line L. Even the code signals may be considered as representing digits, and in the example illustrated in FIG. 2 the device is set for the transmission of code digits 5347678. The six first digits are set by means of the connecting members 72–77 in the same manner as the digits of the area number and the subscriber's number. These six first digits may for instance indicate the identity of the sending station. The last digit should indicate what kind of alarm that initiated the signalling, that is, which of the alarm contacts LAK1, LAK2 . . . (FIG. 1) has been actuated. For this purpose the last conductor 42 in the group of conductors for the code setting is connected to each of the conductors 1 – 10 of the second set of conductors by means of automatically operable connecting members. In the shown embodiment each such automatically operable connecting member consists of a couple of diodes L50 – L51, . . . L68 – L69. The junction between these two diodes is connected over a third diode L70 . . . L79 with the junction between two resistors R50 – R51, . . . R68 – R69, one of which is connected to the negative pole of a voltage source and the other of which is connected to a change-over contact KK1 . . . KK10 which in its initial position is connected to zero potential and in working position to a positive potential. The changeover contacts KK1 – KK10 are operated by corresponding relays (not shown) which are controlled by the code unit KE in response to the alarm contacts LAK1, LAK2, . . . Instead of relays with change-over contacts KK flip-flops could be used. When such a change-over contact, e.g., KK1, is in its initial position and the corresponding resistor R51 is connected to zero potential, the connection between the conductor 42 and the conductor (1) of the second set of conductors is blocked, since the diode L51 receives negative bias over diode L70 and resistor R50. When the change-over contact, e.g., KK1, is changed to the working position and thus connects positive potential to resistor R51, both diodes L50 and L51 become conductive, since the diode L70 is now blocked. Therefore the conductor 42 is conductively connected with the conductor 1. In the same way the conductor 42 can be connected to any one of the conductors 1 – 10 by changing the corresponding change-over contact KK to its working position. In the example illustrated in FIG. 2 it is assumed that the alarm contact LAK8 has been actuated, whereby the corresponding change-over contact KK8 has been changed to the working position and the conductor 42 is conductively connected to the conductor 8 over the diodes L64 – L65, and thus the last code digit will be 8.

The code unit KE (FIG. 1) is preferably provided with means for preventing more than one of the change-over contacts KK1 – KK10 from being actuated at the same time. Thus, if signalling has been initiated because one of the alarm contacts LAK1, LAK2 . . . has been actuated, and a further alarm contact is actuated while this signalling is going on, no other change-over contact KK1 – KK10 will be actuated. However, for each alarm contact the code unit KE is provided with an optical indicating means, e.g., a lamp which is lighted when the corresponding alarm contact is actuated. Persons arriving at the sending station because of the transmitted alarm signals will hereby notice that one or more additional alarm contacts have been actuated and may take suitable steps to handle these further alarms.

When the digit counter DC has been stepped after the last code digit has been transmitted, it activates the AND-gate G21 the second input of which is already activated from the output KS of the program counter PRR. Gate G21 now delivers an output signal over conductor 43 and gates G68 and G67, and this output signal resets the pulse counter PC and the digit counter DC and steps the program counter PRR to position ST.

Figure 4:
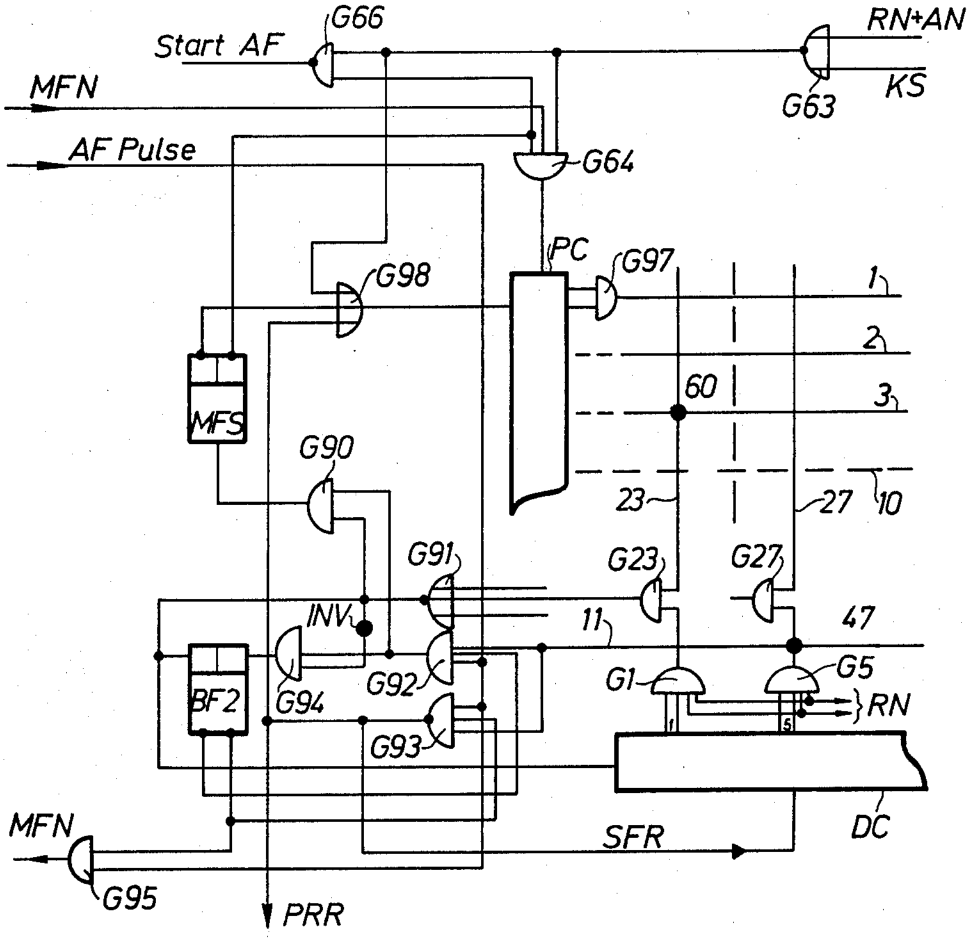
FIG. 4 shows a part of a modified embodiment of the dialling and code transmitting unit.

A modified embodiment of the dialling and code transmitting unit NK (FIG. 1) is shown in FIG. 4. The means for setting the desired number and code signal are similar to those shown in FIG. 2 and comprise a first set of conductors and a second set of conductors with connecting members for connecting any one of the conductors of the first set with any one conductor of the other set. However, in the embodiment shown in FIG. 4 the conductors of the first set of conductors are not connected to any fixed potential, and the conductors of the second set of conductors are not connected to any rectifier chain corresponding to the rectifier chain GK in FIG. 2. The pulse counter PC to the outputs of which the conductors 1 – 10 of the second set of counductors are connected, is so designed that it delivers the signal "1" from that output to which it has been stepped. The digit counter DC is connected in the same manner as in the embodiment shown in FIG. 2 to AND-gates G1 . . . G5 . . . etc. The outputs of these gates are each connected to one input of a separate additional AND-gate G23 . . . G27 . . . etc. the second input of which is connected to conductors 23 . . . 27 . . . respectively of the first set of conductors. Each of the gates G1 . . . G5 . . . etc. is designed to deliver an output signal "1" when both inputs are activated.

The pulse counter PC and the digit counter DC may both be of the known type "divide by two, divide by five", that is, the counter comprises four flip-flops, one of which forms a first partial counter having two outputs and the three others form a second partial counter having five outputs, and each of the ten outputs of the counter as a whole is connected over an AND-gate to one output of the first partial counter and one output of the second partial counter. Each such pair of outputs consisting of one output from the first partial counter and one output of the second partial counter form a code combination representing one of the decimal digits 0 – 9, and said gates serve as decoders of these code combinations. For the pulse counter PC one of these gates, namely G97, is shown in FIG. 4. For the digit counter DC the gates G1 . . . G5 etc. are also used as decoders, and therefore each such gate is connected by two conductors to the respective output of the digit counter DC.

The conductors of the first set of conductors and the associated gates are divided in the same manner as in the embodiment shown in FIG. 2 in three groups, the first group of which controls the transmission of area number, the second group controls the transmission of subscriber's number, and the third group control the transmission of code signals. For the sake of simplicity FIG. 4 only shows some conductors (23, 27) and the associated gates (G23, G1 and G27, G5 respectively) of the first group. The outputs of the digit counter DC are connected in the same manner as in the embodiment shown in FIG. 2 to inputs of the gates G1 . . . G5 etc., that is, the first gate of each group has its one input connected to the first output of the digit counter DC, the second gate of each group has its one input connected to the second output of the digit counter DC etc. The output RN of the program counter PRR (FIG. 1) is connected to the second input of all gates of the first group (G1 – G5), while the output AN is connected to the second input of all gates of the second group (not shown), and the output KS is connected to the second input of all gates of the third group (not shown). The program counter PRR can be of the same type as the pulse counter PC and the digit counter DC, that is, of the type "divide by two, divide by five", and the decoding can be effected in the gates connected to said outputs. In FIG. 4 this is indicated by the connection from output RN to gates G1 – G5 containing two conductors. Thus, the gates connected to the output of the digit counter DC is utilized not only for the control of the transmitted pulse trains but also as decoders for the digit counter DC and the program counter PRR, which means a considerable saving of components.

The embodiment shown in FIG. 4 also comprises a conductor 11 which can be connected by manually operable connecting members to the output from any of the gates in each group of gates connected to the digit counter DC. In the Figure one such connecting member 47 is shown which connects the output of gate G5 with the conductor 11. The conductor 11 is connected to one input of each of two gates G92 and G93. Normally the conductor 11 carries zero potential, but when any of the gates to which it is connected delivers an output signal the conductor will carry signal "1".

The other parts of the embodiment shown in FIG. 4 will be described in the following explanation of the mode of operation of this embodiment.

It is assumed that the program counter PRR (FIG. 1) has been stepped in the manner described above to output RN and that the digit counter DC is in position 1. The first digit of the area number is now to be transmitted. From output RN of the program counter PRR an activating signal is delivered to gate G66 over gate G63. The gate G66 is an AND-gate and its second input at the same time receives an activating signal from one output of the monostable multivibrator MFS. The gate G66 delivers an output signal to the multivibrator AF (FIG. 1) which is thereby started. The output of multivibrator AF is connected to an input of each of the three gates G92, G93 and G95. The gate G92 which is an AND-gate has one input connected to the conductor 11 which now carries zero potential. A second input of gate G92 is connected to one output of a bistable flip-flop BF2 which now delivers the signal "0" at said output. When now a first negative-going pulse edge appears at the conductor from the multivibrator AF, all inputs of the gate G92 receive zero potential and its output then delivers the signal "o". This signal is applied to one input of an AND-gate G94, the other input of which is connected over an inverter INV to the output of the OR-gate G91. This gate now delivers the signal "1" at its output, and due to the effect of the inverter INV the other input of the gate G94 also receives the signal "0", and gate G94 then produces an output signal which changes the flip-flop BF2. The first mentioned output of this flip-flop BF2 then delivers the signal "1" which is applied to the gate G92 and blocks this gate. The other output of the flip-flop BF2 which is connected to one input of an AND-gate G95, goes from "1" to "0". The gate G95 the second input of which now receives the signal "0" from the multivibrator AF, delivers an output signal which triggers the monostable multivibrator MFN (FIG. 1) which controls the pulse relay IR in the line connecting unit LA (FIG. 5). Therefore a first break pulse is transmitted over line L (FIGS. 1 and 5). The output of the monostable multivibrator MFN is also connected over the AND-gate G64 to the pulse counter PC, so that the pulse counter is shifted one step when the multivibrator MFN returns from its unstable to its stable state. This means that the pulse counter PC is stepped one step immediately after the transmission of each break pulse on line L. After the first pulse the pulse counter PC is thus stepped to that output which is connected to conductor 1. The negative-going edge of the next pulse from the flip-flop AF again triggers the monostable multivibrator MFN over gate G95. This gate still receives the signal "0" at its first input from the flip-flop BF2, and therefore the monostable multivibrator MFN is triggered again, and a second pulse is transmitted over line L. When the multivibrator MFN returns to its stable state, the pulse counter PC is stepped to conductor 2.

In the same manner the negative-going edge of a third pulse from the multivibrator AF causes the transmission of a third pulse on line L, and at the end of this pulse the pulse counter PC is stepped to conductor 3. In the shown embodiment this conductor is connected by a connecting member 60 to the conductor 23, and this conductor now receives the signal "1" which is applied to one input of the AND-gate G23, the other input of which already receives the signal "1" from the gate G1. Therefore gate G23 delivers at its output the signal "1" which is applied to an input of the OR-gate G91. This gate has an inverted output and thus delivers the signal "0" from its output. This output is connected to a reset input of the flip-flop BF2 and also to the digit counter DC. Under the control of this signal the flip-flop BF2 is reset and the digit counter DC is stepped to the next output. The output of gate G91 is also connected to one input of an AND-gate G90 the other input of which is connected to the output of gate G92. The AND-gate G90 now receives the signal "0" at both inputs and then delivers a signal from its output which is connected to the monostable multivibrator MFS. This multivibrator is now changed to its unstable state and delivers from its one output a pulse which resets the pulse counter PC. From its other output the multivibrator MFS delivers a signal which blocks the gates G64 and G66. Because of the blocking of gate G66 the multivibrator AF is stopped. The monostable multivibrator MFS determines the time interval between two pulse trains (digits) in the same manner as in the embodiment shown in FIG. 2. When it is restored to its stable state, gate G66 is again opened, the multivibrator AF is started, and the next pulse train is transmitted.

After the transmission of the last pulse train which represents the last digit of the area number, the digit counter DC is stepped to that output which is connected to gate G5. The output of this gate is connected by the connecting member 47 to the conductor 11, and therefore this conductor now receives a positive potential (signal "1"). The AND-gate G92 now receives from conductor 11 the signal "1" at one of its inputs. As a result of this the monostable multivibrator MFS is now not triggered over gate G90 but remains in its stable state. Therefore, the multivibrator AF is not yet stopped. This multivibrator is so designed that the interval between the falling edge of a pulse and the rising edge of the next pulse is somewhat larger than the interval during which the monostable multivibrator MFN (FIG. 1) is in its unstable state. Therefore a rising pulse edge (signal "1") now arrives from the multivibrator AF and is applied to one input on each of the gates G92, G93 and G95. This signal has no effect on the gates G92 and G95. The gate G93 is of the type delivering an output signal "0" when all three of its inputs receive the signal "1". The first input of gate G93 now receives the signal "1", its second input already has the signal "1" from the output of the reset flip-flop BF2, and its third input receives the signal "1" from the conductor 11. Consequently gate G93 now delivers an output signal which is applied to the digit counter DC and resets this counter and also to the program counter PRR (FIG. 1) and steps this to the output OH. When the program counter PRR is then stepped to outputs AN and KS in the manner previously described, the transmission of the subscriber's number and the code signals respectively is accordingly effected.

As will be seen from the above description the monostable multivibrator MFS does not assist the stepping of the program counter PRR after the transmission of the last pulse train of the area number (and the subscriber's number and the code signals respectively). Therefore, the time interval between the transmission of the last pulse of the last pulse train and the stepping of the program counter PRR becomes considerably less than the restoring time of the monostable multivibrator MFS which is an advantage. However, in this case the pulse counter PC does not receive any reset signal from the multivibrator MFS. Therefore, the reset input of the pulse counter PC is also connected over an OR-gate G98 to the output of gate G93 and to the outputs RN and AN of the program counter PRR, whereby it is made doubly sure that the counter PC is always reset before number dialling or code transmission commences.

FIG. 5 shows more in detail the line connecting unit LA. In addition to the parts already mentioned above the unit LA comprises a matching network NN of known kind which is connected between the line L and the transformer TR. The unit LA also comprises a relay KR which is controlled from the outputs RN and AN of the program counter PRR and has a make contact which short-circuits the line L between the pulsing contact of relay IR and the input terminals of the matching network NN when pulse transmission is going on. The transformer TR is provided with three windings, namely a first winding which is connected to line L over the network NN, a second winding which is connected over contacts of the relay KSR to the oscillator OSC (FIG. 1), and a third winding which is connected to the signal receiver SMT (FIG. 1) The pulse contact of relay IR is associated with a spark quenching device shown in FIG. 5 as a series circuit of a resistor and a capacitor.

Figure 6:
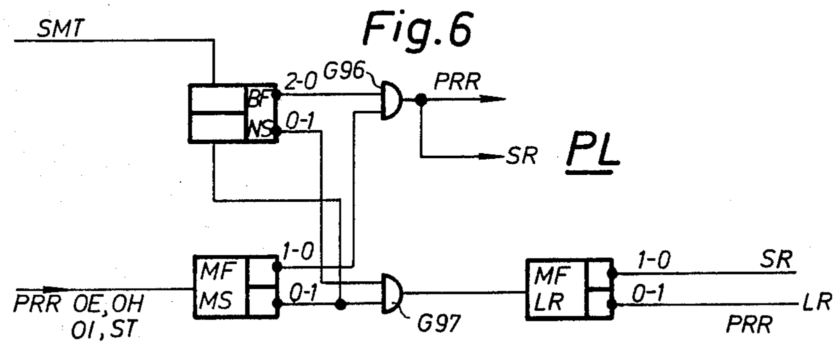
FIG. 6 shows a circuit diagram of a program logic unit.

FIG. 6 shows an embodiment of the program logic PL. This comprises a first monostable multivibrator MFMS the trigger input of which is connected over the OR-gate G84 (FIG. 1) to the outputs OE, OH, OI and ST of the program counter PRR. As described above these outputs of the program counter represent waiting positions for the arrival of certain signals from the exchange and the receiving station. When the program counter PRR is stepped to one of these outputs, the monostable multivibrator MFMS in the program logic is triggered and changed to its unstable state. Hereby an output of the multivibrator MFMS delivers the signal "0" to an AND-gate G96 the other input of which is connected to a flip-flop BFNS. This flip-flop has a set input connected to the output of the signal receiver SMT (FIG. 1). The monostable multivibrator MFMS returns to its stable state after a predetermined waiting time. If the expected signal arrives before this waiting time has elapsed, the flip-flop BFNS is triggered from the signal receiver SMT and delivers the signal "0" to the other input of the AND-gate G96. This gate delivers an output signal which is applied to the program counter PRR and advances this one step, and which is also applied to the stop counter SR for resetting this counter. When the multivibrator MFMS is restored to its stable state it delivers a trigger pulse to a second input of the flip-flop BFNS so that this is reset.

If the expected signal does not arrive within the predetermined time, that is, if the monostable multivibrator MFMS is restored to its stable state without the flip-flop BFNS having been triggered from the signal receiver SMT, a second AND-gate G97 is activated, one input of which already receives the signal "0" from an output of the flip-flop BFNS, and the other input of which is also supplied with the signal "0" when the multivibrator MFMS is restored to its stable state. The gate G97 then delivers a trigger pulse to a second monostable multivibrator MFLR. This multivibrator has a first output connected to the line relay LR in the line connecting unit LA (FIG. 5). In its stable state the multivibrator MFLR delivers at this output a signal keeping the line relay LR operated. When the multivibrator MFLR is now changed to its unstable state, the line relay LR is deenergized and the whole device is disconnected (at contacts LR, FIG. 1) from line L. This first output of the multivibrator MFLR is also connected to the program counter PRR, so that this is set to zero when the multivibrator MFLR is changed to its unstable state. When the multivibrator MFLR is restored to its stable state, the line relay LR is again operated and the signalling procedure is started from the beginning, provided that the alarm contact (LAK in FIG. 1) which inititated the signalling remains in actuated state.

The signal receiver SMT (FIG. 1) is designed in known manner so that it is responsive only to desired signals, that is dialling tone from the exchange before the transmission of area number and subscriber's number and return signal and stop signal from the receiving station. Other signals such as busy tone, special information tone and call denied tone cannot cause the signal receiver SMT to deliver a triggering signal to the program logic PL.

The stop counter SR (FIG. 1) may be of the same type as the program counter PRR, e.g., of the type "divide by two, divide by five". The gates required for the decoding may be included in the stop counter.

The described embodiments of the invention are intended for establishing a connection which requires the assistance of two exchanges, and the telephone system is such that a dialling tone must be received from the first exchange after dialling of the area number before the dialling of the subscriber's number can take place. However, the telephone systems of many countries are such that when a connection is established over two exchanges no dialling tone is transmitted from the first exchange after the dialling of the area number, but the calling subscriber, after having dialed the area number, can immediately proceed to dial the called subscriber's number without waiting for a dialling tone. The device according to this invention can easily be adapted for use in telephone systems of the last mentioned kind. For this purpose the code selecting unit, that is the two sets of conductors and the gates (G23 – G34 in FIG. 2) directly connected to the first set of conductors and the OR-gate (G22 in FIG. 2) connected to the output of these gates, may be mounted on a removable card which is provided with suitable contact members which engage corresponding fixed contacts in the code selecting unit when the card is plugged into this unit.

A first such card may be designed for telephone systems in which dialling tone is to arrive after the dialling of the area number, and in this case the connections between the card and the other parts of the dialling unit will be such as shown in the embodiments described above (FIGS. 2 or 4).

A second such card can be designed for dialling in telephone systems in which dialling tone between the area number and the subscriber's number is not used. The number of digits to be sent in sequence to establish the desired connection usually exceeds ten. In this case the connections between the said card and the other parts of the dialling unit are so designed that a certain number, e.g., five, of the first digits of the desired number are transmitted while the program counter PRR is in position RN. After the transmission of these five first digits the digit counter DC is reset and the program counter PRR is stepped to position AN. In this case the program counter should not remain in the intermediate position OH, and therefore it is so programmed that it steps itself automatically and without time delay from position OH to position AN. This programming can be effected by means of conductors arranged on the card so that when the card is plugged in they provide those connections between different parts of the program counter PRR which are required in order that the program counter shall step itself from position OH to position AN. For resetting the digit counter DC after the transmission of the first digits the same circuits as those shown in FIG. 4 can be used. If the digit counter DC is to be reset after the five first digits, the gate at the sixth output from the digit counter is connected to conductor 11 by means of the connecting member 47. However, in that case the corresponding sixth conductor of the first set of conductors cannot be used for the setting and transmission of a pulse train corresponding to a digit. This is a drawback if the number of digits to be transmitted is so large that all conductors must be utilized. In the last mentioned case the resetting of the digit counter DC can be effected by means of two additional gates which are mounted on the card and connected in similar manner as the gates G92 and G93 in FIG. 4, with the difference however that one input of each gate is connected to the output of the gate (G27) which is directly connected to the fifth conductor (27) of the first set of conductors. This conductor can then be used for the setting of the fifth digit of the number, and when all pulses of these digit have been transmitted the output signal from the corresponding gate (G27) causes the digit counter to be reset and the program counter PRR to be stepped from position RN to position OH. As stated above the program counter PRR is stepped without time delay from the position OH to position AN, whereupon the transmission of the other digits of the number is effected in the manner previously described.

A third dialing card may be provided for the case that the receiving station is connected to the same exchange as the sending station, that is for "local calls". This card can be designed in similar manner as the said second card.

The program logic PL (FIG. 6) may be so designed that it steps the program counter PRR from position OE to position RN after a predetermined time independent of the arrival of a dialing tone from the exchange. In this case the monostable multivibrator MFMS when restored to its stable state after having been triggered from the output OE of the program counter PRR should not trigger the multivibrator MFLR but instead step the program counter PRR to position RN. This can be brought about by means of additional gates, which will not be described in detail. A program logic modified in this manner is particularly suited to be used together with the said second dialing card which is intended for use in such telephone systems in which a dialing tone is sent from the exchange to a calling subscriber's station a short time after the subscriber has initiated a call, and in which this dialing tone is such that it does not cause the signal receiver SMT to produce an output signal. When this second dialing card is used, the multivibrator MFMS in the program logic PL should of course not be triggered when the program counter temporarily is in position OH. This can be accomplished in a very simple manner by omitting from said second dialing card the conductor normally connecting the output OH with the multivibrator MFMS.

This conductor may also be omitted on said third dialing card.

Thus, the signalling device of the invention can be easily adapted to meet the various requirements of different telephone systems.

The signalling device can also be used for signalling in the case that there is only an ordinary subscriber's instrument at the receiving station. In this case it is presupposed that when ringing signal is sent to the receiving station a person at that station lifts the hand set and announces his presence by saying "hallo" or his name or directory number or the like. At the sending station this speech signal is passed to the signal receiver SMT and causes it to operate the program logic PL which in turn causes the program counter to be stepped to position KS for the transmission of coded message signals. These should be coded in such manner that they can be easily understood by the listener at the receiving station. It is also prepsupposed that after completed code transmission the person at the receiving station says something, e.g., "thank you" or "understood", to indicate that the message has been received and understood. At the sending station this speech signal is utilized as stop signal which causes the release of the connection and the turn-off of the sending device in the manner previously described. The modifications required in order that it shall be possible to use the signalling device for signalling to an ordinary subscriber's instrument, consist of some changes in the functions of the program counter PRR and the program logic PL. These changes can be brought about by means of suitable circuits on the interchangeable dialing cards mentioned above. Also the signal receiver SMT should be provided with means for transforming the speech signals received from the receiving station to signals suitable for actuating the program logic PL.

The shown and described embodiments are given by way of example only and can be modified in many ways within the scope of the invention.

What is claimed is:

1. A device for automatically establishing connections from a sending station to receiving stations over a telecommunications network having automatic exchanges and for transmitting signals to a receiving station over a connection thus established, said device comprising means for connecting thereto sensing means to be operated in response to occurrences on which information is to be sent to a receiving station, connecting means for automatically connecting the device to a transmission channel leading to a switching center in the automatic telecommunications network, a pulse generator, a code setting unit for the optional setting of an identifying code of a desired receiving station and the setting of a desired code signal to be transmitted to the receiving station, said code setting unit comprising a first set of conductors and a second set of conductors and connecting means for connecting any one of the conductors of the first set of conductors to any one of the conductors of the second set of conductors and means for applying a potential to the conductors of one set of conductors, said first set of conductors comprising several groups of conductors, said groups being allotted to different functions such as the transmission of area numbers, the transmission of subscribers numbers and the transmission of information signals, characterized in that the device further comprises a first counter, control means for connecting said groups of conductors of said first set of conductors in turn to said first counter so that output terminals of said first counter are connected to separate ones of the conductors of the connected group, and said first counter when being stepped forwards in turn marks the conductors of this group, a second counter having its connections connected to separate ones of the conductors of said second set of conductors, said second counter being stepped forwards in response to pulses from said pulse generator, so that the conductors of the second set of conductors are in turn marked by the second counter, a pulse transmission device which is connectable to said transmission channel and controlled by said first and second counters, so that for each conductor marked by said first counter in the first set of conductors a pulse train is transmitted, the number of pulses in each pulse train being determined by the interconnection between the marked conductor of the first set of conductors and the conductors of the second set of conductors, a first resetting device for resetting said second counter after each completed pulse train, a stepping device for stepping said first counter after each completed pulse train so that the next conductor in the same group of conductors of the first set of conductors is marked, a second resetting device for resetting said first counter after it has marked a predetermined number of conductors of the connected group, and said control means being operative after the first counter has marked the conductors of a group to connect the next group of conductors to said first counter.

2. A device as claimed in claim 1, characterized in that it comprises a signal receiver which is automatically connectable to said transmission channel for the reception of signals arriving over this transmission channel and designed to produce control signals in response to such incoming signals, and that said control device is arranged to receive said control signals and to start the transmission of signals under control of these control signals.

3. A device as claimed in claim 2, characterized in that said control device comprises means for resetting the device to its initial state if one or more of said incoming signals fails to arrive, and for starting a new attempt of establishing the desired connection after a predetermined time.

4. A device as claimed in claim 3, characterized in that it comprises a third counter for counting the number of said attempts and for preventing further attempts when this number reaches a predetermined value.

5. A device as claimed in claim 4, characterized in that said control device comprises a fourth counter, in the following referred to as program counter, which is provided with a plurality of outputs which are allotted to different functions required for the establishment of a connection and for the transmission of message signals, such as waiting for dialing tone from the exchange, the transmission of area number, waiting for a new dialing tone, transmission of a subscriber's number, the transmission of start signal to the receiving station, waiting for a reply signal from the receiving station, transmission of coded message signals and waiting for stop signal from the receiving station, and that the device further comprises a program logic responsive to said incoming signals to step the program counter from positions for waiting for incoming signals to positions for the transmission of digit signals and message signals, said program counter being designed to be stepped from positions for signal transmission to positions for the reception of incoming signals after the transmission of a group of signals corresponding to a group of conductors of said first set of conductors.

6. A device as claimed in claim 5, characterized in that it comprises optionally connectable circuits for inhibiting one or more of said functions.

* * * * *